Feb. 13, 1940.  J. C. CROWLEY  2,190,352
RELIEF VALVE
Filed April 6, 1937

INVENTOR.
JOHN C. CROWLEY
BY Kwis Hudson & Kent
ATTORNEYS

Patented Feb. 13, 1940

2,190,352

UNITED STATES PATENT OFFICE 2,190,352

RELIEF VALVE

John C. Crowley, Cleveland Heights, Ohio, assignor to The Dill Manufacturing Company, Cleveland, Ohio, a corporation of Ohio Application April 6, 1937, Serial No. 135,289

1 Claim. (Cl. 137—53)

This invention relates to a pressure relief valve and although a valve embodying the invention might advantageously be used in various relations where it is desired to automatically relieve pressure upon a predetermined pressure being obtained, the invention will be described herein with reference to a pressure relief valve for a receptacle of the type containing fluid under pressure, inasmuch as the pressure relief valve of the invention has particular utility when thus employed.

An object of the present invention is to provide a pressure relief valve which is efficient and accurate in operation.

Another object of the invention is to provide a pressure relief valve which can be set for different predetermined pressures and which will function quickly or instantaneously to relieve the pressure to which it is subjected when the same reaches the predetermined pressure, and which, as soon as the pressure falls below the predetermined pressure, will immediately close to prevent any further reduction thereof.

A further object is to provide a pressure relief valve, which while being accurate and efficient in operation, can be made relatively small in size and will be economical to manufacture.

A still further object is to provide a pressure relief valve that is sturdy in construction, can be readily adjusted for different predetermined pressures, and which will not get out of order or require servicing in use.

Further and additional objects and advantages not hereinbefore specified will become apparent hereinafter during the following detailed description of an embodiment of the invention which is illustrated in the accompanying drawing, wherein Fig. 1 is an elevational view, on a greatly reduced scale, of a receptacle adapted to contain pressure fluid, certain portions of the receptacle being broken away to show the pressure relief valve mounted therein.

Although a pressure relief valve embodying the present invention, can, as has been previously stated, be used advantageously in a wide variety of relations, it will be described herein as mounted in a receptacle containing pressure fluid, with the understanding, however, that this use is merely by way of example and without any intention to limit the invention thereto.

Figure 1:
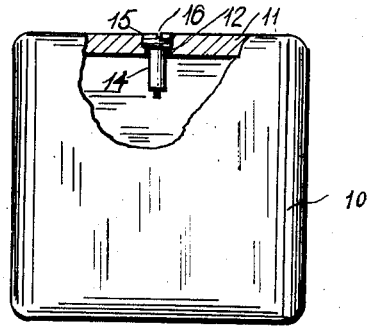

The receptacle 10 shown in Fig. 1 can be of any well known type of receptacle that contains pressure fluid, and may be closed at its upper end by a top closure member 11. In the illustration the pressure relief valve embodying the invention is shown as supported by the cover member 11 and extending into the receptacle, it being understood, however, that the pressure relief valve could be mounted in the receptacle in different locations and in different ways.

The closure member 11 of the receptacle is provided with a counterbore threaded as indicated at 12 and communicating at its bottom with a centrally disposed reduced opening or bore extending through the closure member from the counterbore to the inner side of the member. A suitable sealing gasket 13 may be provided at the bottom of the counterbore for a purpose which will soon become apparent.

The pressure relief valve comprises a tubular member 14 having an enlarged threaded upper end 15, and said tubular member extends through the opening in the closure member and is secured in position by the enlarged threaded upper end 15 of the tubular member being screwed into the threaded counterbore 12 of the closure member. When the tubular member is fully positioned in the receptacle the upper end of the enlarged portion 15 should lie flush with the outer side of the closure member 11, while the sealing gasket 13 at the bottom of the counterbore will be compressed between the shoulder formed by the enlarged portion 15 of the tubular member and the bottom of the counterbore. The upper end of the enlarged portion 15 of the tubular member may be provided with longitudinally extending cut-outs or recesses 16 with which a wrench or other suitable tool can be engaged to facilitate the mounting of the tubular member in the closure member. The tubular member is provided with a bore 17 extending from the lower end of the member and communicating at its upper end with an enlarged counterbore 18 forming in the tubular member an interior annular shoulder 19. The upper end of the counterbore 18 is threaded, as indicated at 20.

A member, which will be termed herein a barrel since it is somewhat similar to the barrel of the usual valve insides or valve core employed in a valve stem, is indicated at 21, and said barrel is provided with a bore 22 extending therethrough from end to end. Adjacent the upper end of the barrel but inwardly thereof the barrel is provided with an integral annular flange 23 of a diameter such as to have a sliding fit in the counterbore 18 of the tubular member 14. The lower end of the barrel is in the form of a substantially conical enlargement 24 that terminates in a narrow edged valve seat 24a. A rubber sealing tube 25 has its upper end secured to the barrel preferably by vulcanization, intermediate the flange 23 and the enlarged conical portion 24. This tube 25 extends downwardly of the bore 17 of the tubular member 14 and is provided at its lower end with an annular outwardly extending bead or rib 26 that projects into a complementary groove or recess formed in the tubular member 14. The barrel 21 will normally be in the position shown in Fig. 2, wherein the flange 23 will engage the shoulder 19 provided at the bottom of the counterbore 18 in the tubular member, which engagement positively limits the inward or downward movement of the barrel.

Figures 2, 3, 4:
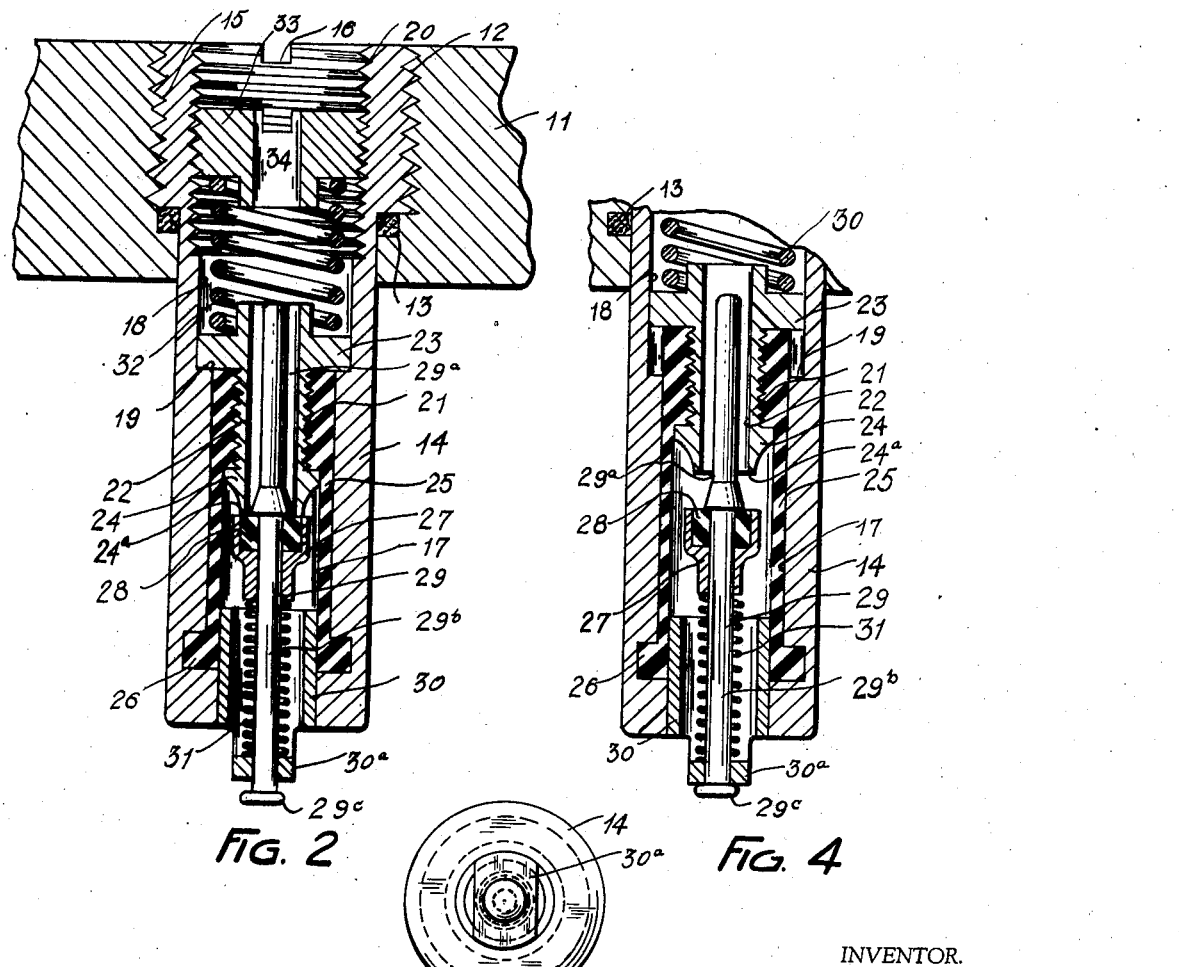
Fig. 2 is a sectional view through the pressure relief valve embodying the invention and a portion of the receptacle closure on a greatly enlarged scale.
Fig. 3 is a bottom plan view of the pressure relief valve shown in Fig. 2.
Fig. 4 is a fragmentary sectional view similar to Fig. 2 but showing the valve of the pressure relief valve in open position to relieve the pressure, the distance to which the valve has moved to open position being greatly exaggerated.

Under certain conditions which will later be referred to, the barrel 21 will be moved upwardly or outwardly in the tubular member 14, whereupon the flange 23 will be out of engagement with the shoulder 19 at the bottom of the counterbore 18 in the tubular member and will lie above the same, as indicated in Fig. 4.

Inasmuch as the sealing tube 25 is formed of rubber or other elastic material and is connected to the barrel 21 and to the tubular member 14 by the rib or bead 26, it will be seen that the upward movement of the barrel will act to stretch said tube, and when the barrel moves back from the position shown in Fig. 4 to the position shown in Fig. 2 the tube 25 will return to its normal condition. The tube 25 acts as a sealing means to prevent the escape of pressure fluid between the barrel 21 and the tubular member 14, and hence any pressure fluid passing outwardly through the pressure relief valve must pass through the bore 22 in the barrel.

This bore 22 through the barrel 21 is normally sealed by a valve formed of a cup-shaped member 27 and carrying within the cup thereof a flexible gasket or packing 28 adapted to engage the valve seat 24a and seal the passage through the bore 22 of the barrel.

The valve just referred to is fixed on a valve pin 29 which has a portion 29a extending above the valve and into the bore 22 of the barrel 21 and serving as a centering and guiding means for the valve and a portion 29b which extends below the valve and is provided at its lower end with a head 29c, this last named portion 29b passing through a tubular bushing 30 secured in the lower end of the bore 17 in the tubular member 14 and provided at its lower end with a narrow downwardly extending bridge or abutment strip 30a having a centrally disposed opening through which the portion 29b of the valve stem extends.

It will be seen that pressure fluid can readily pass into the bushing 30 and into the tubular member 14 around the bridge or abutment strip 30a. A relatively weak coil spring 31 is mounted on the portion 29b of the valve stem between the lower side of the cup 27 of the valve and the inner or upper side of the bridge or abutment strip 30a, and said spring will act to urge the valve upwardly into seating position and until the head 29c engages the bridge or abutment strip 30a, as indicated in Fig. 4, at which time upward movement of the valve will be positively halted. The barrel 21 is normally held in the position shown in Fig. 2, that is with the flange 23 in engagement with the shoulder 19 at the bottom of the counterbore 18 in the tubular member 14, by means of a relatively heavy or strong coil spring 32 arranged in the counterbore and abutting at one end the upper side of the flange 23 and at its opposite side the underside of a threaded adjusting plug 33 having a central opening 34 and which can be screwed inwardly or outwardly of the counterbore 18 which is provided with threads 20 adjacent its outer end as has already been stated. The tension of the spring 32 is adjusted by means of the adjusting plug 33 to exert a predetermined pressure upon the barrel 21 and in accordance with the pressure at which the relief valve should open to relieve the pressure of the pressure fluid, as will later become more apparent. The spring 31 should be of a tension such that the valve will be held seated thereby under normal pressures when the barrel is in the position shown in Fig. 2.

Assuming the pressure relief valve to be mounted in position in a receptacle containing pressure fluid and the tension of the spring 32 to have been set for the valve to function at a predetermined pressure, the operation of the pressure relief valve will now be explained.

When the pressure of the pressure fluid in the receptacle does not equal the predetermined pressure referred to above, the parts of the pressure relief valve will be in the position indicated in Fig. 2 and the valve will be seated in sealing engagement with the valve seat 24a on the lower end of the barrel 21, the sealing tube 25 preventing the escape of pressure fluid outwardly of the tubular member 14 between it and the barrel. At this time the pressure fluid is acting, in conjunction with the spring 31, upon the surface of the cup-shaped member 27 of the valve to urge the valve upwardly or outwardly into seating position. The pressure fluid is also acting on the conically enlarged portion 24 of the barrel 21 and tending to move the barrel outwardly but not effecting any outward movement thereof, since the spring 32 is maintaining the barrel in position with the flange 23 in engagement with the shoulder 19. However, should the pressure of the pressure fluid in the receptacle increase for any reason to a point where it equals or is greater than said predetermined pressure for which the relief valve is set, the force exerted thereby on the cup 27 of the valve and upon the enlarged conical portion 24 of the barrel 21 will move the barrel and valve upwardly against the action of the spring 32. The upward movement of the valve will cease as soon as the head 29c of the valve pin abuts the bridge or abutment strip 30a of the bushing 30. Hence, the continued upward movement of the barrel 21 under the action of the pressure fluid will unseat the valve with respect to the seat 24a at the lower end of the barrel, and the pressure fluid will be free to flow around the valve and into and through the bore 22 in the barrel and through a central opening 34 in the plug 33 and thence, in this instance, to atmosphere. As soon as the pressure of the pressure fluid in the receptacle falls below the said predetermined pressure, the spring 32 will move the barrel downwardly to the position shown in Fig. 2 and the valve will engage the valve seat 24a and thus seal the passage through the barrel and prevent the further reduction in pressure of the pressure fluid in the receptacle.

It will be understood that during the movement of the barrel 21 just referred to, the sealing tube 25 will stretch and contract as the case may be. As already stated, Fig. 4 illustrates the parts in the position wherein the valve is disengaged from the valve seat 24a, but it should be understood that the distance upwardly to which the barrel is shown as having moved is greatly exaggerated in this view for the purpose of clear illustration. In actual practice the barrel would only move a short distance upwardly and the separation of the valve seat 24a and the gasket 28 of the valve would be very slight, in fact would constitute a mere crack, but this would be sufficient to relieve the pressure of the pressure fluid in the receptacle quickly and substantially instantaneously, and as soon as such relief had occurred to allow the reseating of the valve to stop the further reduction in pressure.

From the foregoing it will be seen that the pressure relief valve embodying the present invention will be accurate and efficient in operation and will function substantially instantaneously to relieve the pressure or to stop the reduction in pressure as soon as the pressure of the pressure fluid reaches or falls below, as the case may be, the predetermined pressure for which the spring 32 has been adjusted. In addition, the pressure relief valve embodying the invention is relatively simple in construction and is formed of parts which while sturdy can be manufactured economically.

Although a preferred embodiment of the invention has been illustrated and described herein, it should be understood that the invention is susceptible of various modifications and adaptations within the scope of the appended claim.

Having thus described my invention I claim:

A pressure relief valve comprising a tubular member adapted to have one of its ends in communication with pressure fluid while its opposite end constitutes an outlet, said member having a counterbore therein adjacent said outlet end and a bore extending therethrough from said counterbore to said inlet end, a barrel located in said member and having a valve seat at one end thereof and a bore therethrough, said barrel being movable longitudinally of said member and having adjacent its other end a flange slidably fitting said counterbore and engageable with the bottom thereof to limit movement of the barrel in one direction, an elastic tube interposed between said barrel and the wall of said bore in said member and having one of its ends secured to said barrel intermediate said valve seat and said flange and its opposite end secured to said member, a valve movable longitudinally of said member, means tending to move said valve against said valve seat on said barrel, means tending to move said barrel in the opposite direction and toward said valve with a predetermined pressure, and means limiting said movement of said valve, said barrel being provided with a surface upon which pressure fluid can act to move said barrel against the action of said second named means and in a direction away from said valve.

JOHN C. CROWLEY.